US012014586B2

(12) United States Patent
Yoshimizu

(10) Patent No.: US 12,014,586 B2
(45) Date of Patent: Jun. 18, 2024

(54) ABNORMALITY DIAGNOSIS DEVICE

(71) Applicant: TOYOTA JIDOSHA KABUSHIKI KAISHA, Toyota (JP)

(72) Inventor: Tetsuya Yoshimizu, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 17/655,787

(22) Filed: Mar. 21, 2022

(65) Prior Publication Data

US 2022/0309842 A1 Sep. 29, 2022

(30) Foreign Application Priority Data

Mar. 23, 2021 (JP) ................................ 2021-048963

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 5/085* (2013.01)

(58) Field of Classification Search
CPC ............ G05B 23/0272; G01R 31/005; G07C 5/0808; G07C 5/008; G07C 5/085; G07C 2205/02; G06F 9/44; G06F 11/302
See application file for complete search history.

(56) References Cited

U.S. PATENT DOCUMENTS

| | | | | |
|---|---|---|---|---|
| 2006/0047382 | A1* | 3/2006 | Morioka | G07C 5/0808 701/31.9 |
| 2007/0271014 | A1* | 11/2007 | Breed | B60R 21/01558 701/31.9 |
| 2010/0057292 | A1 | 3/2010 | Ishikawa et al. | |
| 2011/0313616 | A1 | 12/2011 | Tsuchikiri et al. | |
| 2017/0109222 | A1* | 4/2017 | Singh | G06F 11/0751 |
| 2020/0051347 | A1* | 2/2020 | Bohl | G06Q 10/04 |

FOREIGN PATENT DOCUMENTS

| | | | |
|---|---|---|---|
| CN | 101660974 | A | 3/2010 |
| CN | 102245437 | A | 11/2011 |
| JP | 2009293951 | A | 12/2009 |

* cited by examiner

*Primary Examiner* — Kenneth J Malkowski
(74) *Attorney, Agent, or Firm* — Hunton Andrews Kurth LLP

(57) ABSTRACT

An abnormality diagnosis device includes: an acquisition unit that acquires a DTC and FFD stored in a vehicle storage unit of a vehicle; a diagnosis engine having a CPU and a storage device; and a database that stores a plurality of discriminant sets corresponding to the respective DTCs. A discriminant item relating to a vehicle part that is a possible cause of an abnormality represented by a corresponding DTC is associated with each of the discriminant sets. Each of the discriminant items has part information showing a vehicle part and a discriminant table including a rule for analyzing the FFD relating to the vehicle part. The diagnosis engine diagnoses whether the vehicle part has an abnormality by retrieving the discriminant set corresponding to the DTC and analyzing the FFD in accordance with the discriminant table of the discriminant item associated with that discriminant set.

5 Claims, 7 Drawing Sheets

| TIME | | | | |
|---|---|---|---|---|
| t (m) | t (m+1) | t (m+2) | t (m+3) | t (m+4) |
| 100 | 200 | 300 | 400 | 410 |

FIG. 3

30

| DTC | DISCRIMINANT SET | ITEM NUMBER |
|---|---|---|
| Pxxxx | Dset11 | 1 |
| Pxxxy | Dset21 | 2, 3 |
| | Dset22 | 4, 5 |
| | Dset23 | 6, 7 |
| Pxxxz | Dset31 | 5, 8, 9 |
| | Dset32 | 8, 10 |
| | | |

| DISCRIMINANT ITEM |
|---|
| IT(1) |
| IT(2) |
| IT(3) |
| IT(4) |
| IT(5) |
| |
| IT(N) |

FIG. 4

| DISCRIMINANT ITEM | ITEM TYPE | FIRST SUB-ELEMENT | SECOND SUB-ELEMENT |
|---|---|---|---|
| IT(1) | FFD ITEM | – | – |
| IT(2) | FFD ITEM | – | – |
| IT(3) | DISCRIMINANT ITEM A11 | FFD ITEM | – |
| IT(4) | CALCULATION ITEM B21 | FFD ITEM | – |
| | | FFD ITEM | – |
| IT(5) | DISCRIMINANT ITEM A12 | CALCULATION ITEM B22 | FFD ITEM |
| | | | FFD ITEM |
| | FFD ITEM | – | – |
| | | | |

FIG. 5

| | TIME-DIRECTION COUPLING METHOD | START TIME | END TIME | COMPARATIVE OPERATOR | COMPARATIVE VALUE |
|---|---|---|---|---|---|
| PT11 | MAXIMUM | 1 | 5 | > | Th11 |
| PT12 | NONE | 1 | – | = | Th12 |
| PT13 | MINIMUM | 3 | 5 | < | Th13 |
| RT14 | EXTRACTION (4) | 1 | 5 | < | Th14 |

FIG. 6

| | ITEM TYPE | TIME-DIRECTION COMPUTATION METHOD | TIME POSITION |
|---|---|---|---|
| PT21 | FFD | DIFFERENCE | 1 |
| PT22 | FFD | EXTENSION | 2 |

FIG. 7

| TIME | | | | |
|---|---|---|---|---|
| t (m) | t (m+1) | t (m+2) | t (m+3) | t (m+4) |
| 0 | 100 | 200 | 300 | 310 |

FIG. 8

| TIME | | | | |
|---|---|---|---|---|
| t (m) | t (m+1) | t (m+2) | t (m+3) | t (m+4) |
| 200 | 200 | 200 | 200 | 200 |

FIG. 12

| TIME | | | | |
|---|---|---|---|---|
| t (m) | t (m+1) | t (m+2) | t (m+3) | t (m+4) |
| 100 | 200 | 300 | 400 | 500 |
| 600 | 700 | 800 | 900 | 1000 |

FIG. 13

| TIME | | | | |
|---|---|---|---|---|
| t (m) | t (m+1) | t (m+2) | t (m+3) | t (m+4) |
| −500 | −500 | −500 | −500 | −500 |

ABNORMALITY DIAGNOSIS DEVICE

CROSS-REFERENCE TO RELATED APPLICATION

This application claims priority to Japanese Patent Application No. 2021-048963 filed on Mar. 23, 2021, incorporated herein by reference in its entirety.

BACKGROUND

1. Technical Field

The present disclosure relates to an abnormality diagnosis device that investigates the cause of an abnormality of a vehicle.

2. Description of Related Art

Japanese Unexamined Patent Application Publication No. 2009-293951 describes one example of abnormality diagnosis devices that investigate the cause of an abnormality of a vehicle. When an abnormality occurs in a vehicle, a DTC and FFD are stored in a storage device of the vehicle. DTC stands for Diagnostic Trouble Code. FFD stands for Freeze Frame Data.

According to JP 2009-293951 A, when an analysis center provided outside the vehicle receives the DTC and the FFD stored in the storage device of the vehicle, a list of all vehicle parts that can be the cause of the abnormality represented by the DTC is created at the analysis center. Then, the FFD is analyzed by data mining or the like. A vehicle part that is diagnosed not to be the cause of the abnormality as a result of the analysis is removed from the list. In this way, the vehicle parts that are a possible cause of the abnormality can be narrowed down. In JP 2009-293951 A, the analysis center corresponds to the abnormality diagnosis device.

SUMMARY

In the case of diagnosis using vehicle information like FFD, a diagnosis program stored in a storage unit of the abnormality diagnosis device is sometimes updated for purposes such as increasing the diagnostic accuracy and adding diagnosable contents.

Here, each of a plurality of business entities including vehicle manufacturers and vehicle dealerships is equipped with an abnormality diagnosis device for performing abnormality diagnosis of vehicle parts. In some cases, the diagnosis programs stored in the storage units of the respective diagnosis devices have substantially the same specifications but were created in different programing languages.

In such a case, ensuring that the same diagnosis result can be obtained by each of the diagnosis devices requires individually updating the diagnosis programs in those diagnosis devices. As a result, standardizing the diagnostic accuracy and the diagnosable contents among the diagnosis devices takes enormous effort and time. It is therefore desired to develop an abnormality diagnosis device that allows the diagnostic accuracy and the diagnosable contents to be changed without updating the diagnosis program itself.

An abnormality diagnosis device to solve the above problem is a device that is capable of communicating with a vehicle and investigates the cause of an abnormality in the vehicle. The vehicle has a function of, when an abnormality occurs, storing in a vehicle storage unit an abnormality identification code that is a code showing details of the abnormality and vehicle information that is time-series data of vehicle state values that are values showing a vehicle state and includes the vehicle state value at the time of occurrence of the abnormality. This abnormality diagnosis device includes: an acquisition unit that acquires the abnormality identification code and the vehicle information stored in the vehicle storage unit; a diagnosis engine having an execution device and a storage device that stores a diagnosis program to be executed by the execution device; and a database which stores a plurality of discriminant sets corresponding to the respective abnormality identification codes and in which contents stored are rewritable. A discriminant item is associated with each of the discriminant sets, the discriminant item being an item relating to a vehicle part that is a possible cause of an abnormality represented by a corresponding one of the abnormality identification codes. Each of the discriminant items has part information that is information showing the vehicle part, and a discriminant table including a rule for analyzing the vehicle information relating to the vehicle part. The diagnosis engine retrieves, from the database, one of the discriminant sets that corresponds to the abnormality identification code acquired by the acquisition unit. The diagnosis engine diagnoses whether the vehicle part shown by the part information of the discriminant item associated with the retrieved discriminant set has an abnormality by analyzing the vehicle information acquired by the acquisition unit in accordance with the rule in the discriminant table of the discriminant item.

According to this configuration, to investigate the cause of an abnormality in the vehicle, the diagnosis engine retrieves, from the database, the discriminant set corresponding to the abnormality identification code acquired by the acquisition unit. Then, the diagnosis engine analyzes the vehicle information in accordance with the rule of the discriminant item associated with that discriminant set. Thus, it is possible to diagnose whether the vehicle part shown by the part information of the discriminant item has an abnormality.

This abnormality diagnosis device allows the diagnostic accuracy and the diagnosable contents to be changed by changing the contents of the discriminant items associated with the discriminant sets, changing the number of the discriminant items, or changing or adding to the rule. Therefore, the diagnosis program stored in the storage device itself need not be updated.

Thus, this configuration allows the diagnostic accuracy and the diagnosable contents to be changed without having to update the diagnosis program. In one aspect of the abnormality diagnosis device, the discriminant table may have, as the rule, information on a processing method of the vehicle information for deriving, from the vehicle information, a processed value that is a value used to determine whether the vehicle part has an abnormality. The discriminant table may further have information on a comparative value that is a value to be compared with the processed value, and information on a comparative operator for comparing the processed value and the comparative value. The diagnosis engine may derive the processed value by analyzing the vehicle information in accordance with the processing method in the discriminant table. The diagnosis engine may compare the comparative value in the discriminant table and the processed value using the comparative operator in the discriminant table, and diagnose whether the vehicle part has an abnormality based on a result of the comparison.

According to this configuration, after retrieving the discriminant table, the diagnosis engine derives a processed value by analyzing the vehicle information in accordance with the processing method in the discriminant table. Then, the diagnosis engine compares the derived processed value and the comparative value in the discriminant table using the comparative operator in the discriminant table. Based on the comparison result, the diagnosis engine diagnoses whether the vehicle part has an abnormality.

Thus, this abnormality diagnosis device allows the processed value to be changed by changing the discriminant table so as to change the processing method, without changing the diagnosis program. When the derived processed value changes, the diagnostic accuracy also changes. Changing the discriminant table so as to change the comparative value can change the diagnostic accuracy without changing the diagnosis program. Further, changing the discriminant table so as to change the comparative operator can change the diagnostic accuracy without changing the diagnosis program.

In one aspect of the abnormality diagnosis device, the discriminant table may further have information on an item type. The discriminant items may include those of which the item type in the discriminant table is an item of the vehicle information and those of which the item type in the discriminant table is a calculation item. The calculation item may have a calculation table. The calculation table may include information on a processing method by which the vehicle information is processed to derive processed data that is time-series data including a plurality of values. When the item type in the discriminant table of the discriminant item is the item of the vehicle information, the diagnosis engine may derive the processed value by analyzing the vehicle information in accordance with the processing method in the discriminant table, compare the comparative value in the discriminant table and the processed value using the comparative operator in the discriminant table, and diagnose whether the vehicle part has an abnormality based on a result of the comparison. On the other hand, when the item type in the discriminant table of the discriminant item is the calculation item, the diagnosis engine may derive the processed data in the same format as the vehicle information by processing the vehicle information in accordance with the processing method in the calculation table of the calculation item, derive the processed value by analyzing the processed data in accordance with the processing method in the discriminant table, compare the comparative value in the discriminant table and the processed value using the comparative operator in the discriminant table, and diagnose whether the vehicle part has an abnormality based on a result of the comparison.

According to this configuration, when the item type in the discriminant table of the retrieved discriminant item is the item of the vehicle information, the diagnosis engine derives a processed value by analyzing the vehicle information specified by the item of the vehicle information in accordance with the processing method in the discriminant table. Then, the diagnosis engine compares the derived processed value and the comparative value in the discriminant table using the comparative operator in the discriminant table. Based on the comparison result, the diagnosis engine diagnoses whether the vehicle part has an abnormality.

On the other hand, when the item type in the discriminant table of the retrieved discriminant item is the calculation item, the diagnosis engine derives processed data by processing the vehicle information in accordance with the processing method in the calculation table of the calculation item. Next, the diagnosis engine derives a processed value by analyzing the processed data in accordance with the processing method in the discriminant table. Then, the diagnosis engine compares the derived processed value and the comparative value in the discriminant table using the comparative operator in the discriminant table. Based on the comparison result, the diagnosis engine diagnoses whether the vehicle part has an abnormality.

Thus, changing the calculation table of the calculation item so as to change the processing method can change the processed data and the processed value without changing the diagnosis program. As a result, the diagnostic accuracy can be changed.

In one aspect of the abnormality diagnosis device, for the calculation item, one or more items of the vehicle information may be set as sub-elements. Those of the calculation items that have a plurality of sub-elements may be designated as prescribed calculation items. Then, in a case where the item type in the discriminant table of the discriminant item is the calculation item and the calculation item is not the prescribed calculation item, the diagnosis engine may derive the processed data by processing the vehicle information specified by the item of the vehicle information set as the sub-element in accordance with the processing method in the calculation table, derive the processed value by analyzing the processed data in accordance with the processing method in the discriminant table, compare the comparative value in the discriminant table and the processed value using the comparative operator in the discriminant table, and diagnose whether the vehicle part has an abnormality based on a result of the comparison. In a case where the item type in the discriminant table of the discriminant item is the calculation item and the calculation item is the prescribed calculation item, the diagnosis engine may derive a plurality of pieces of processed data by processing a plurality of pieces of vehicle information specified by the respective items of the vehicle information set as the sub-elements in accordance with the processing method in the calculation table, derive reprocessed data in the same format as the vehicle information by performing subtraction on values of the pieces of processed data for each of times, derives the processed value by analyzing the reprocessed data in accordance with the processing method in the discriminant table, compare the comparative value in the discriminant table and the processed value using the comparative operator in the discriminant table, and diagnose whether the vehicle part has an abnormality based on a result of the comparison.

According to this configuration, when the item type in the discriminant table of the retrieved discriminant item is the prescribed calculation item, the diagnosis engine derives a plurality of pieces of processed data by processing a plurality of pieces of vehicle information in accordance with the processing method in the calculation table. Specifically, first processed data is derived by processing first vehicle information among the pieces of vehicle information. Second processed data is derived by processing second vehicle information among the pieces of vehicle information. Next, the diagnosis engine derives reprocessed data by performing subtraction on values of the pieces of processed data for each of times. Thus, one piece of reprocessed data is derived based on the pieces of processed data. Then, the diagnosis engine derives a processed value by analyzing the reprocessed data in accordance with the processing method in the discriminant table. Next, the diagnosis engine compares the derived processed value and the comparative value in the discriminant table using the comparative operator in the discriminant table. Based on the comparison result, the diagnosis engine diagnoses whether the vehicle part has an abnormality.

Thus, changing the calculation table of the calculation item so as to change the processing method can change the pieces of processed data, the reprocessed data, and the processed value without changing the diagnosis program. As a result, the diagnostic accuracy can be changed.

In one aspect of the abnormality diagnosis device, when those of the discriminant sets with which a plurality of discriminant items is associated are designated as predetermined discriminant sets, in the predetermined discriminant set, an order of priority that defines an order of diagnosis may be set for the discriminant items. When the diagnosis engine retrieves the predetermined discriminant set from the database, the diagnosis engine may execute diagnosis in order from the vehicle part shown by the part information of the discriminant item that ranks high in the order of priority among the discriminant items of the predetermined discriminant set. When the diagnosis engine diagnoses that the vehicle part has an abnormality as a result of diagnosis for one of the discriminant items, the diagnosis engine may not execute diagnosis for remaining discriminant items.

Compared with performing diagnosis for all discriminant item, this configuration can shorten the time taken to investigate the cause of an abnormality in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a schematic view showing the data configuration of a database of the abnormality diagnosis device;

FIG. 4 is a table showing the data configuration of each discriminant item;

FIG. 5 is a table showing one example of a discriminant table of a discriminant item;

FIG. 6 is a table showing one example of a calculation table of a calculation item;

FIG. 7 is a table showing one example of time-series data derived by processing the FFD in accordance with the calculation table;

FIG. 8 is a table showing one example of time-series data derived by processing the FFD in accordance with the calculation table;

FIG. 12 is a table showing one example of two pieces of FFD that are sub-elements of a calculation item; and FIG. 13 is a table showing one example of time-series data derived by the calculation process for a calculation item.

DETAILED DESCRIPTION OF EMBODIMENTS

One embodiment of an abnormality diagnosis device of a vehicle will be described below in accordance with FIG. 1 to FIG. 13.

Figures 1, 2:
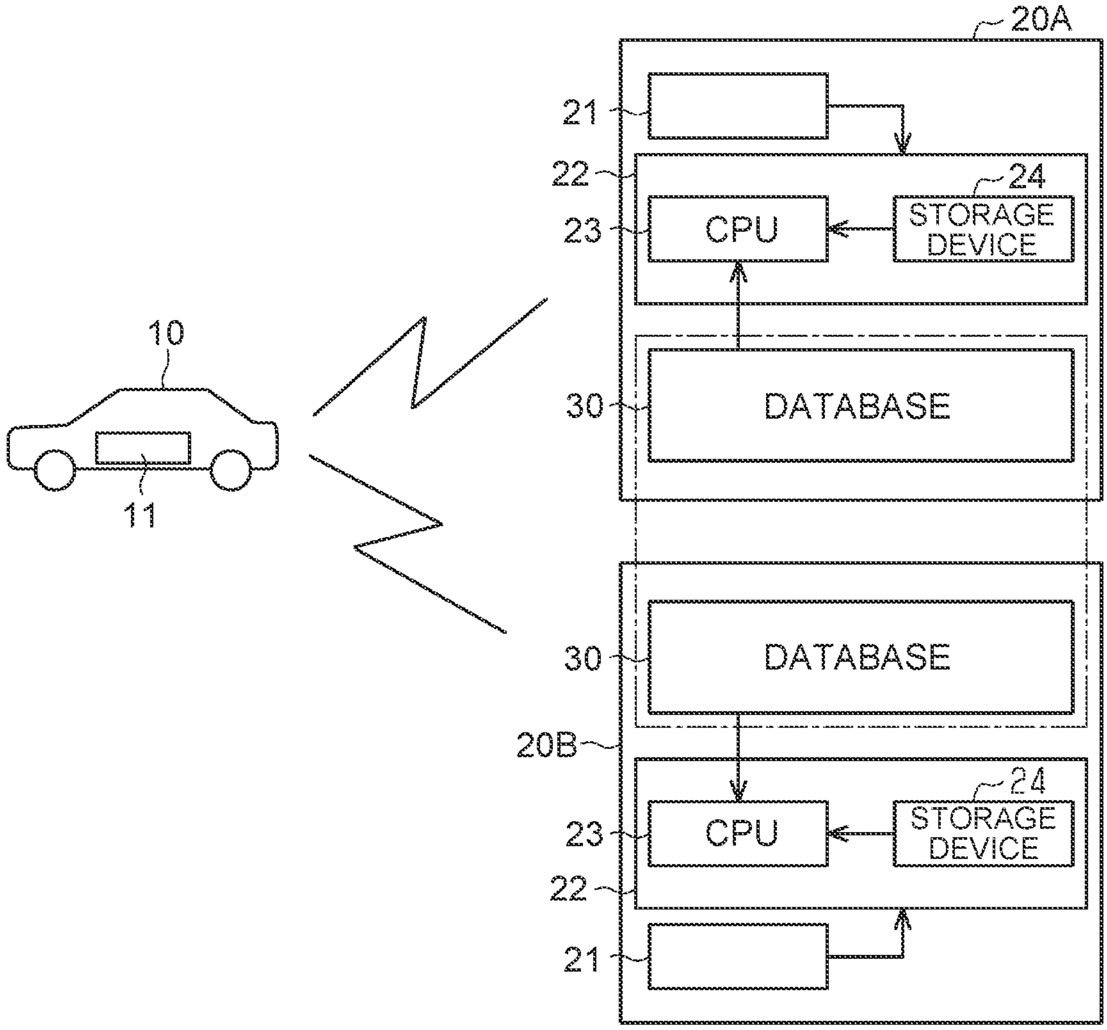
FIG. 1 is a diagram showing abnormality diagnosis devices of an embodiment and a vehicle.
FIG. 2 is a view showing one example of FFD in the event of an abnormality in the vehicle.

FIG. 1 shows abnormality diagnosis devices 20A, 20B. Each of the abnormality diagnosis devices 20A, 20B has a function of receiving various pieces of information from a vehicle 10. The vehicle 10 has a function of storing a DTC and FFD in a vehicle storage unit 11 when an abnormality occurs in the vehicle 10.

The DTC is a code showing details of an abnormality having occurred in the vehicle 10. Thus, the DTC corresponds to the "abnormality identification code." The FFD is time-series data of vehicle state values that are values showing a vehicle state. The FFD is data including the vehicle state value at the time of occurrence of an abnormality in the vehicle 10. Thus, the FFD corresponds to the "vehicle information." DTC stands for Diagnostic Trouble Code. FFD stands for Freeze Frame Data.

FIG. 2 shows one example of the FFD. The FFD is data including, for example, five vehicle state values that are consecutive in chronological order. Of the plurality of vehicle state values, the vehicle state value corresponding to time t (m+3), i.e., the fourth vehicle state value is the vehicle state value at the time of occurrence of the abnormality. The vehicle state value is, for example, a sensor value or a command value.

Examples of abnormalities that occur in the vehicle 10 include a misfire in an internal combustion engine and a failure to start the internal combustion engine.

Abnormality Diagnosis Devices 20A, 20B

As shown in FIG. 1, each of the abnormality diagnosis devices 20A, 20B includes an acquisition unit 21, a diagnosis engine 22, and a database 30.

The acquisition unit 21 acquires the DTC and the FFD stored in the vehicle storage unit 11. For example, the acquisition unit 21 receives the DTC and the FFD from the vehicle 10 through a network. Alternatively, the acquisition unit 21 may acquire the DTC and the FFD from the vehicle 10 using a diagnosis dongle.

The diagnosis engine 22 has a CPU 23 and a storage device 24. The storage device 24 stores a diagnosis program executed by the CPU 23. In this embodiment, the CPU 23 corresponds to the "execution device." The CPU 23 investigates the cause of an abnormality in the vehicle 10 by executing the diagnosis program and thereby analyzing the DTC and the FFD acquired by the acquisition unit 21.

The diagnosis programs stored in the storage devices 24 of the abnormality diagnosis devices 20A, 20B are substantially the same but not necessarily exactly the same. That is, the diagnosis program of the abnormality diagnosis device 20A and the diagnosis program of the abnormality diagnosis device 20B may be created in different program languages as long as these programs have the same specifications. Being substantially the same here means that when the contents of the databases 30 are the same, the abnormality diagnosis device 20A and the abnormality diagnosis device 20B produce the same diagnosis result.

FIG. 3 is a block diagram showing the data configuration in the database 30. The database 30 is a rewritable memory. The database 30 stores a plurality of discriminant sets corresponding to the respective DTCs. For example, a discriminant set Dset11 is provided as the discriminant set for a DTC "Pxxxx." Discriminant sets Dset21, Dset22, and Dset23 are provided as the discriminant sets for a DTC "Pxxxy." Discriminant sets Dset31 and Dset32 are provide as the discriminant sets for a DTC "Pxxxz." Thus, there is one or more discriminant sets corresponding to each DCT.

As shown in FIG. 3, the database 30 stores N discriminant items IT. N is an integer not smaller than two, and, for example, a value larger than 10 is set as N. At least one discriminant item IT is associated with each discriminant set.

For example, a discriminant item IT(1) with the item number 1 is associated with the discriminant set Dset11. A discriminant item IT(2) with the item number 2 and a discriminant item IT(3) with the item number 3 are associated with the discriminant set Dset21. A discriminant item IT(4) with the item number 4 and a discriminant item IT(5) with the item number 5 are associated with the discriminant set Dset22. A discriminant item IT(6) with the item number 6 and a discriminant item IT(7) with the item number is 7 are associated with the discriminant set Dset23. The discriminant item IT(5) with the item number 5, a discriminant item IT(8) with the item number 8, and a discriminant item IT(9) with the item number 9 are associated with the discriminant set Dset31. The discriminant item IT(8) with the item number 8 and a discriminant item IT(10) with the item number 10 are associated with the discriminant set Dset32.

The discriminant sets stored in the database 30 include a predetermined discriminant set. The predetermined discriminant set refers to a discriminant set with which a plurality of discriminant items is associated. In FIG. 3, the discriminant sets Dset21, Dset22, Dset23, Dset31, and Dset32 correspond to the predetermined discriminant set.

The discriminant item IT has part information that is information showing a vehicle part, and a discriminant table. The vehicle part here refers to, for example, a fuel injection valve, a spark plug, or a starter motor. The discriminant table includes a rule for analyzing the FFD relating to the vehicle part.

FIG. 4 shows an example of the discriminant table of the discriminant items IT. As shown in FIG. 4, in the discriminant item IT(1) and the discriminant item IT(2), an FFD item is set as the item type. This means that the discriminant items IT(1) and IT(2) are items for which whether the vehicle part shown by the part information of the discriminant item IT has an abnormality is diagnosed by analyzing one piece of FFD specified by the FFD item. In this embodiment, since the FFD corresponds to the vehicle information, the FFD item corresponds to "the item of vehicle information."

In the discriminant item IT(3), a discriminant item A11 is set as the item type. For the discriminant item A11, an FFD item is set as a first sub-element. The discriminant item A11 is one of the discriminant items IT(1) to IT(N) other than the discriminant item IT(3). This means that the discriminant item IT(3) is an item for which whether the vehicle part shown by the part information of the discriminant item IT(3) has an abnormality is diagnosed by analyzing the FFD specified by the FFD item that is the first sub-element.

In the discriminant item IT(4), a calculation item B21 is set as the item type. For the calculation item B21, two FFD items are set as the first sub-elements. When the calculation item having a plurality of sub-elements is designated as a "prescribed calculation item," the calculation item B21 corresponds to the prescribed calculation item.

The discriminant item IT(4) is an item for which whether the vehicle part shown by the part information of the discriminant item IT(4) has an abnormality is diagnosed by analyzing the two pieces of FFDs specified by the two FFD items that are the first sub-elements. More specifically, whether the vehicle part has an abnormality is diagnosed by creating a new piece of processed data based on the FFD specified by each of the FFD items that are the first sub-elements of the calculation item B21 and analyzing this processed data. The format of the processed data is the same as the format of the FFD. Therefore, the processed data is time-series data composed of a plurality of values.

In the discriminant item IT(5), a discriminant item A12 and one FFD item are set as the item type. For the discriminant item A12, a calculation item B22 is set as the first sub-element. For the calculation item B22, two FFD items are set as second sub-elements. Thus, the calculation item B22 corresponds to the "prescribed calculation item." The second sub-element is an element of lower order than the first sub-element.

The discriminant item IT(5) is an item for which whether the vehicle part shown by the part information of the discriminant item IT(5) has an abnormality is diagnosed by analyzing the FFD specified by each FFD item. More specifically, one piece of processed data is created based on the FFD specified by each of the FFD items that are the second sub-elements of the calculation item B22. The format of the processed data is the same as the format of the FFD. Therefore, the processed data is time-series data composed of a plurality of values. Whether the vehicle part has an abnormality is diagnosed by analyzing the analysis result of this processed data and the FFD specified by a remaining FFD item.

As shown in FIG. 5, other than the item type, the discriminant table of each discriminant item IT has information on a time-direction coupling method, information on a start time, information on an end time, information on a comparative operator, and information on a comparative value. The information on the time-direction coupling method, the information on the start time, and the information on the end time correspond to the "rule" for analyzing the FFD. The information on the time-direction coupling method also corresponds to the "information on the processing method" of the FFD.

FIG. 5 shows an example of the discriminant table of the discriminant item IT.

In a pattern PT11, the start time is 1 and the end time is 5. It is assumed that the item type of the discriminant item IT is the FFD item, and that the FFD specified by the FFD item is the FFD shown in FIG. 2. In this case, among 100, 200, 300, 400, and 410, the first value specified by the start time is 100 and the fifth value specified by the end time is 410. In this case, 100, 200, 300, 400, and 410 are selected and a processed value is derived based on the selected values.

In the pattern PT11, the time-direction coupling method is "maximum." When the coupling method is "maximum," the largest value of the selected values is derived as a processed value. In the case of the FFD shown in FIG. 2, therefore, 410 is derived as a processed value.

In the pattern PT11, the comparative operator is ">" and the comparative value is "Th11." In this case, it is determined whether the above processed value is larger than the comparative value Th11.

In a pattern PT12 shown in FIG. 5, the time-direction coupling method is "none," the start time is 1, and the end time is not set. In this case, the first value indicated by the start time is derived as a processed value. For example, it is assumed that the item type of the discriminant item IT is the FFD item and that the FFD specified by the FFD item is the FFD shown in FIG. 2. In this case, among 100, 200, 300, 400, and 410, the first value specified by the start time is 100. Therefore, 100 is derived as a processed value.

In the pattern PT12, the comparative operator is "=" and the comparative value is Th12. In this case, it is determined whether the above processed value is equal to the comparative value Th12.

In a pattern PT13 shown in FIG. 5, the start time is 3 and the end time is 5. For example, it is assumed that the item type of the discriminant item IT is the FFD item and that the FFD specified by the FFD item is the FFD shown in FIG. 2.

In this case, among 100, 200, 300, 400, and 410, the third value specified by the start time is 300 and the fifth value specified by the end time is 410. In this case, 300, 400, and 410 are selected and a processed value is derived based on the selected values.

In the pattern PT13, the time-direction coupling method is "minimum." When the coupling method is "minimum," the smallest value of the selected values is derived as a processed value. In the case of the FFD shown in FIG. 2, therefore, 300 is derived as a processed value.

In the pattern PT13, the comparative operator is "<" and the comparative value is "Th13." In this case, it is determined whether the above processed value is smaller than the comparative value Th13.

In a pattern PT14 shown in FIG. 5, the start time is 1 and the end time is 5. For example, it is assumed that the item type of the discriminant item IT is the FFD item and that the FFD specified by the FFD item is the FFD shown in FIG. 2. In this case, among 100, 200, 300, 400, and 410, the first value specified by the start time is 100 and the fifth value specified by the end time is 410. In this case, 100, 200, 300, 400, and 410 are selected and a processed value is derived based on the selected values.

In the pattern PT14, the time-direction coupling method is "extraction (4)." In this case, the fourth value is extracted from among the selected values as a processed value. In the case of the FFD shown in FIG. 2, therefore, 400 is extracted as a processed value.

In the pattern PT14, the comparative operator is "<" and the comparative value is Th14. In this case, it is determined whether the above processed value is smaller than the comparative value Th14.

For some discriminant items IT, a calculation item is set as the item type. In this case, a processed value is derived based on time-series data that is derived in accordance with a calculation table in the calculation item to be described later. The method of deriving a processed value based on this time-series data is the same as the method of deriving a processed value based on the FFD that has been described using FIG. 5. That is, a processed value is derived by processing the time-series data using the time-direction coupling method, the start time, and the end time in the discriminant table. Then, the derived processed value and the comparative value in the discriminant table are compared using the comparative operator in the discriminant table.

Next, the calculation item will be described with reference to FIG. 6.

The calculation item has an item type and a calculation table. The FFD item is set as the item type of the calculation item. The calculation table includes a processing method by which the FFD specified by the FFD item is processed to derive processed data that is time-series data including a plurality of values. The format of the processed data is the same as the format of the FFD. Therefore, the processed data is time-series data composed of a plurality of values.

As shown in FIG. 6, the calculation table has information on a time-direction computation method and information on a time position. The information on the time-direction computation method and the information on the time position correspond to "information on the processing method of the calculation table." Thus, processed data is derived by processing the FFD in accordance with the computation method based on one of the values composing the FFD that is specified by the time position.

In a pattern PT21 shown in FIG. 6, the item type is the FFD item, the time-direction computation method is "difference," and the time position is 1. This means that, of the five vehicle state values composing the FFD, the vehicle state value specified by the time position is used as a reference value, and that the difference between the remaining four vehicle state values and the reference value is derived. For example, it is assumed that the FFD specified by the FFD item is the FFD shown in FIG. 2. In this case, since the time position is 1, 100 that is the first vehicle state value of 100, 200, 300, 400, and 410 is set as the reference value. Then, since "difference" is specified as the computation method, the difference between the remaining four vehicle state values and 100 is derived. As a result, the processed data shown in FIG. 7 is derived.

In a pattern PT22 shown in FIG. 6, the item type is the FFD item, the time-direction computation method is "extension," and the time position is 2. This means that one of the five vehicle state values composing the FFD that is specified by the time position is used as a reference value, and that the remaining four vehicle state values are replaced with the reference value. For example, it is assumed that the FFD specified by the FFD item is the FFD shown in FIG. 2. In this case, since the time position is 2, 200 that is the second vehicle state value of 100, 200, 300, 400, and 410 is set as the reference value. Then, since "extension" is specified as the computation method, the remaining four vehicle state values are replaced with 200. As a result, the processed data shown in FIG. 8 is derived.

Flow of Process Executed by Diagnosis Engine 22

Figure 9:
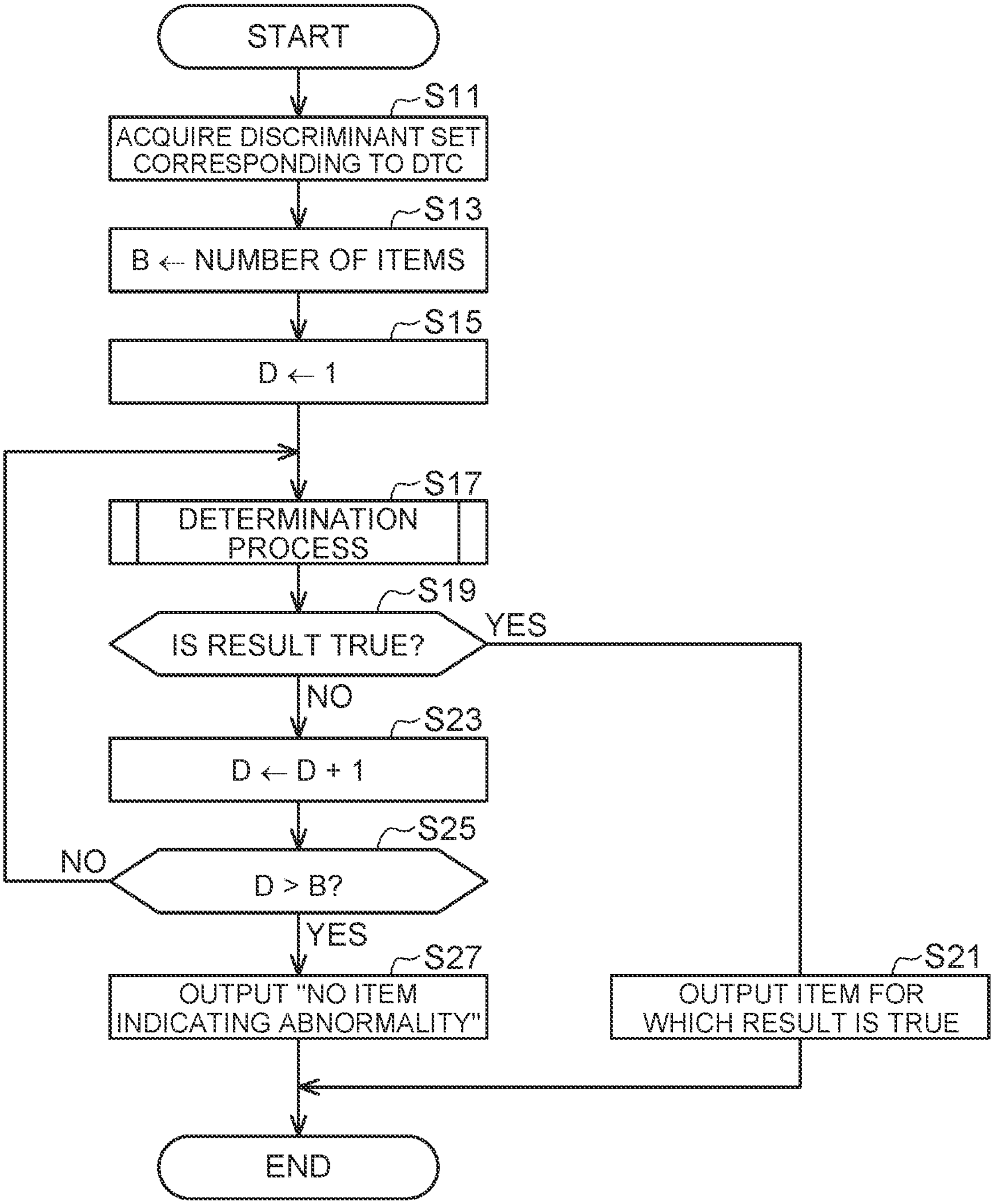
FIG. 9 is a flowchart illustrating a main processing routine for diagnosing whether a vehicle part has an abnormality.

A main processing routine executed by the diagnosis engine 22 to investigate the cause of an abnormality in the vehicle 10 will be described with reference to FIG. 9. The main processing routine shown in FIG. 9 is realized as the CPU 23 executes the diagnosis program stored in the storage device 24.

In the main processing routine, in the first step S11, the diagnosis engine 22 acquires, from the database 30, the discriminant set corresponding to the DTC acquired by the acquisition unit 21. Depending on the DTC, a plurality of discriminant sets may be associated. Therefore, the diagnosis engine 22 executes the processes of step S13 and the subsequent steps the same number of times as the number of the discriminant sets acquired.

In the next step S13, the diagnosis engine 22 sets the number of items that is the number of the discriminant items associated with the discriminant set as a loop number-of-times B. For example, when the DTC acquired by the acquisition unit 21 is "Pxxxx" shown in FIG. 3, 1 is set as the loop number-of-times B. Then, in step S15, the diagnosis engine 22 sets 1 as a factor D.

In step S17, the diagnosis engine 22 executes a determination process of determining whether the vehicle part shown by the part information of the discriminant item IT has an abnormality by analyzing the FFD in accordance with the discriminant table of the discriminant item IT. That is, the diagnosis engine 22 executes a sub-routine to be described using FIG. 10. The sub-routine for executing this determination process will be described later.

Figure 10:
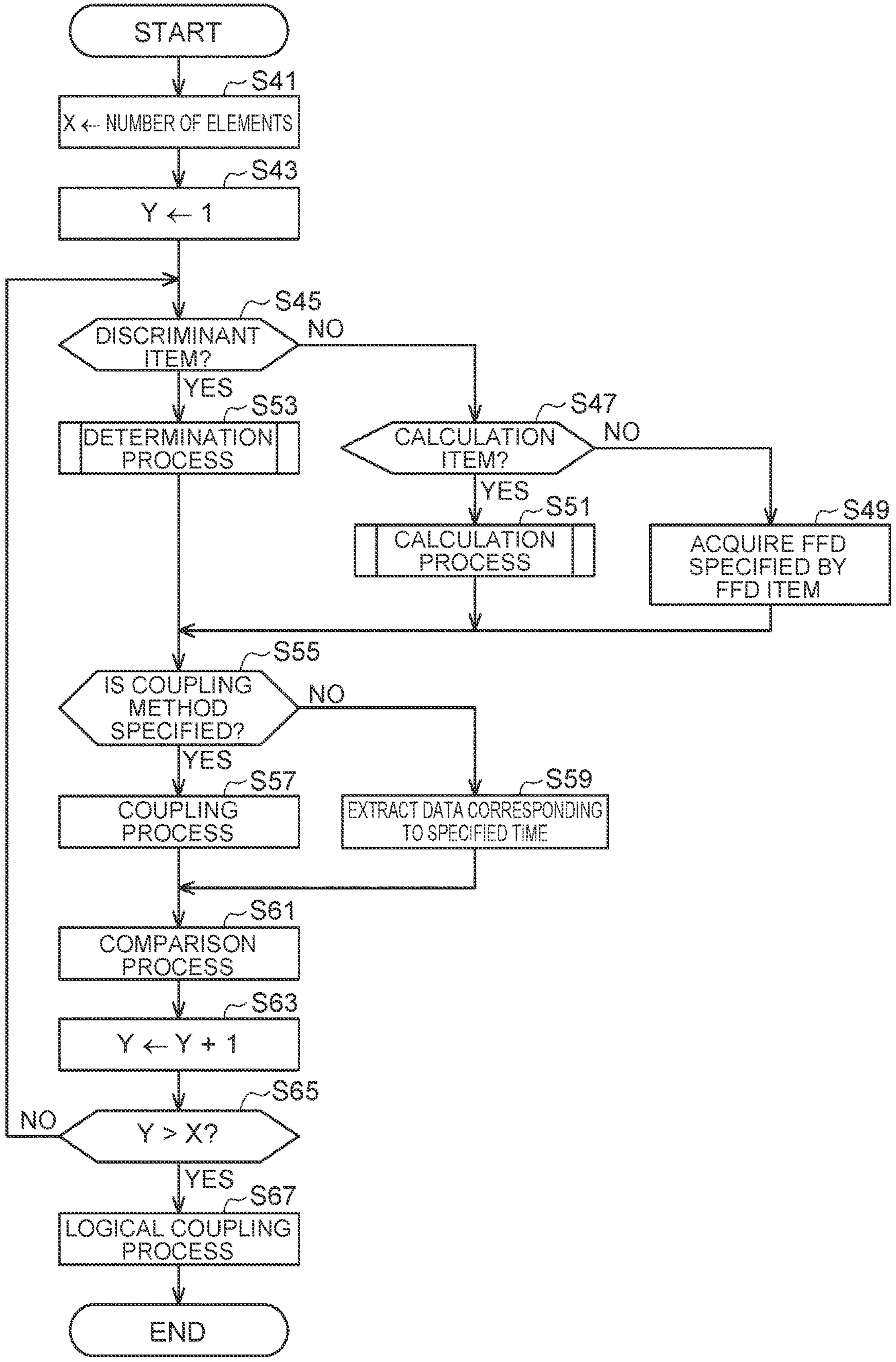
FIG. 10 is a flowchart illustrating a sub-routine for executing a determination process for a discriminant item.

After executing the sub-routine of FIG. 10 and ending the determination process, the diagnosis engine 22 moves to the process of step S19. In step S19, the diagnosis engine 22 determines whether the result of the determination process is true. The result is true when it is determined that the vehicle part shown by the part information of the discriminant item IT has an abnormality. The result is false when it is not determined that the vehicle part shown by the part information of the discriminant item IT has an abnormality.

When the result of the determination process is true (S19: YES), the diagnosis engine 22 moves to the process of step S21. In step S21, the diagnosis engine 22 outputs the discriminant item IT for which the result is true. Specifically, the diagnosis engine 22 outputs a notification to the effect that the vehicle part shown by the part information of the discriminant item IT for which the result is true may have an abnormality. Then, the diagnosis engine 22 ends the main processing routine.

On the other hand, when the result of the determination process is not true (NO) in step S19, the result is false and the diagnosis engine 22 moves to the process of step S23. In step S23, the diagnosis engine 22 increments the factor D by one. Then, in step S25, the diagnosis engine 22 determines whether the factor D is larger than the loop number-of-times B. When the factor D is equal to or smaller than the loop number-of-times B, there is still one or more discriminant items IT among the discriminant items IT associated with the discriminant set for which the determination process has not yet been executed. Therefore, when the factor D is equal to or smaller than the loop number-of-times B (S25: NO), the diagnosis engine 22 moves to the process of step S17. In this case, the diagnosis engine 22 executes the determination process of determining whether the vehicle part shown by the part information of a discriminant item IT different from the one for which the determination process has been executed last time has an abnormality by analyzing the FFD in accordance with the discriminant table of that discriminant item IT. That is, the diagnosis engine 22 executes the sub-routine of FIG. 10.

Here, when a plurality of discriminant items IT is associated with the discriminant set, the diagnosis engine 22 executes the determination process for the discriminant items IT in order of decreasing priority. For example, a discriminant item IT with a smaller item number shown in FIG. 3 may be set as a discriminant item ranking higher in the order of priority than a discriminant item IT with a larger item number.

On the other hand, when the factor D is larger than the loop number-of-times B (YES) in step S25, the diagnosis engine 22 moves to the process of step S27. In this case, the diagnosis engine 22 has failed to identify a vehicle part that may have an abnormality. In step S27, therefore, the diagnosis engine 22 outputs a notification to the effect that there is no item indicating an abnormality. That is, the diagnosis engine 22 outputs a notification to the effect that a vehicle part that may have an abnormality was not found out. Then, the diagnosis engine 22 ends the main processing routine.

The sub-routine for executing the determination process will be described with reference to FIG. 10. The sub-routine shown in FIG. 10 is realized as the CPU 23 executes the diagnosis program stored in the storage device 24.

In this sub-routine, in the first step S41, the diagnosis engine 22 sets the number of elements in the discriminant item as a loop number-of-times X. The number of elements here refers to the number of the item types in the discriminant item for which the determination process is to be executed. For example, when the determination process for the discriminant item IT(1) shown in FIG. 4 is to be executed, 1 is set as the loop number-of-times X. For example, when the determination process for the discriminant item IT(5) is to be executed, 2 is set as the loop number-of-times X.

In the next step S43, the diagnosis engine 22 sets 1 as a factor Y. Then, in step S45, the diagnosis engine 22 determines whether the element to be processed is a discriminant item. When the element to be processed is not a discriminant item (S45: NO), the diagnosis engine 22 moves to the process of step S47.

In step S47, the diagnosis engine 22 determines whether the element to be processed is a calculation item. When the element to be processed is not a calculation item (S47: NO), the diagnosis engine 22 moves to the process of step S49. In this case, the element to be processed is an FFD item.

In step S49, the diagnosis engine 22 acquires the FFD specified by the FFD item. Then, the diagnosis engine 22 moves to the process of step S55.

On the other hand, when the element to be processed is a calculation item (YES) in step S47, the diagnosis engine 22 moves to the process of step S51. In step S51, the diagnosis engine 22 executes the calculation process of the calculation item. That is, the diagnosis engine 22 executes a sub-routine to be described using FIG. 11. The sub-routine for executing this calculation process will be described later. In the calculation process, processed data is derived in accordance with the calculation table of the calculation item. After executing the sub-routine of FIG. 11 and ending the calculation process, the diagnosis engine 22 moves to the process of step S55.

Here, according to the structure of the diagnosis program, when a calculation item is set as the item type or the sub-element, the calculation process for a low-order element is completed before the determination process for a high-order element. Specifically, when the item type of the discriminant item IT is the calculation item, a sub-element is sometimes set for the calculation item. Here, a calculation item that is set as a sub-element is referred to as a sub-calculation item. The FFD specified by the FFD item set as the sub-element of the sub-calculation element is processed by executing the calculation process for the sub-calculation item, and a result of the calculation process for the sub-calculation item is output. Thereafter, the determination process for the discriminant item IT is executed using the result of the calculation process for the sub-calculation item.

On the other hand, when the element to be processed is a discriminant item (YES) in step S45, the diagnosis engine 22 moves to the process of step S53. In step S53, the diagnosis engine 22 executes the determination process for the discriminant item (i.e., the sub-element). The diagnosis engine 22 executes the determination process for the discriminant item by executing the sub-routine of FIG. 10. When the discriminant item here is a discriminant item of the first sub-element, in step S41, the number of second sub-elements corresponding to this first sub-element is set as the loop number-of-times X.

Here, according to the structure of the diagnosis program, when a low-order element is set, the determination process for low-order element is completed before the determination process for a high-order element. Specifically, when the item type of the discriminant item IT is the discriminant item (here referred to as a "sub-discriminant item"), a sub-element is set for the sub-discriminant item. The FFD specified by the FFD item set as the sub-element of the sub-discriminant item is processed by executing the determination process for the sub-discriminant item, and a result of the determination process for the sub-discriminant item is output. Thereafter, the determination process for the discriminant item IT is executed using the result of the determination process for the sub-discriminant item.

After ending the determination process of step S53, the diagnosis engine 22 moves to the process of step S55.

In step S55, the diagnosis engine 22 determines whether the time-direction coupling method is specified by the discriminant table. The coupling method is specified in the case of the patterns PT11, PT13, and PT14 among the patterns PT11 to PT14 shown in FIG. 5. On the other hand, the coupling method is not specified in the case of the pattern PT12. When the coupling method is specified (S55: YES), the diagnosis engine 22 moves to the process of step S57. In step S57, the diagnosis engine 22 executes a coupling process of deriving a processed value based on the vehicle state values of the FFD in accordance with the specified coupling method. Then, the diagnosis engine 22 moves to the process of step S61.

On the other hand, when the coupling method is not specified (NO) in step S55, the diagnosis engine 22 moves to the process of step S59. In step S59, the diagnosis engine 22 extracts the vehicle state value corresponding to the time specified by the discriminant table and sets the extracted vehicle state value as a processed value. Then, the diagnosis engine 22 moves to the process of step S61.

In step S61, the diagnosis engine 22 executes the comparison process of comparing the processed value and the comparative value using the comparative operator and the comparative value in the discriminant table. In the comparison process, the diagnosis engine 22 sets a value according to the result as an output value. For example, the diagnosis engine 22 outputs 1 as an output value when the result of the comparison process is true, and outputs 0 as an output value when the result is false.

In the next step S63, the diagnosis engine 22 increments the factor Y by one. In the next step S65, the diagnosis engine 22 determines whether the factor Y is larger than the loop number-of-times X. When the factor Y is equal to or smaller than the loop number-of-times X (S65: NO), the diagnosis engine 22 moves to the process of step S45. Then, the diagnosis engine 22 changes the element to be processed and executes the processes of step S45 and the subsequent steps. On the other hand, when the factor Y is larger than the loop number-of-times X (S65: YES), the diagnosis engine 22 moves to the process of step S67.

In step S67, the diagnosis engine 22 executes a logical coupling process. For example, when the loop number-of-times X is one, in the logical coupling process, the diagnosis engine 22 outputs the output value output by the comparison process of step S61 as a coupled value. When the loop number-of-times X is two or larger, the diagnosis engine 22 outputs a value based on a plurality of output values as a coupled value. For example, when at least one of the outputs is 1, the diagnosis engine 22 outputs 1 as a coupled value. On the other hand, when all the output values are 0, the diagnosis engine 22 outputs 0 as a coupled value. After thus outputting the coupled value, the diagnosis engine 22 ends the sub-routine of FIG. 10.

Figure 11:
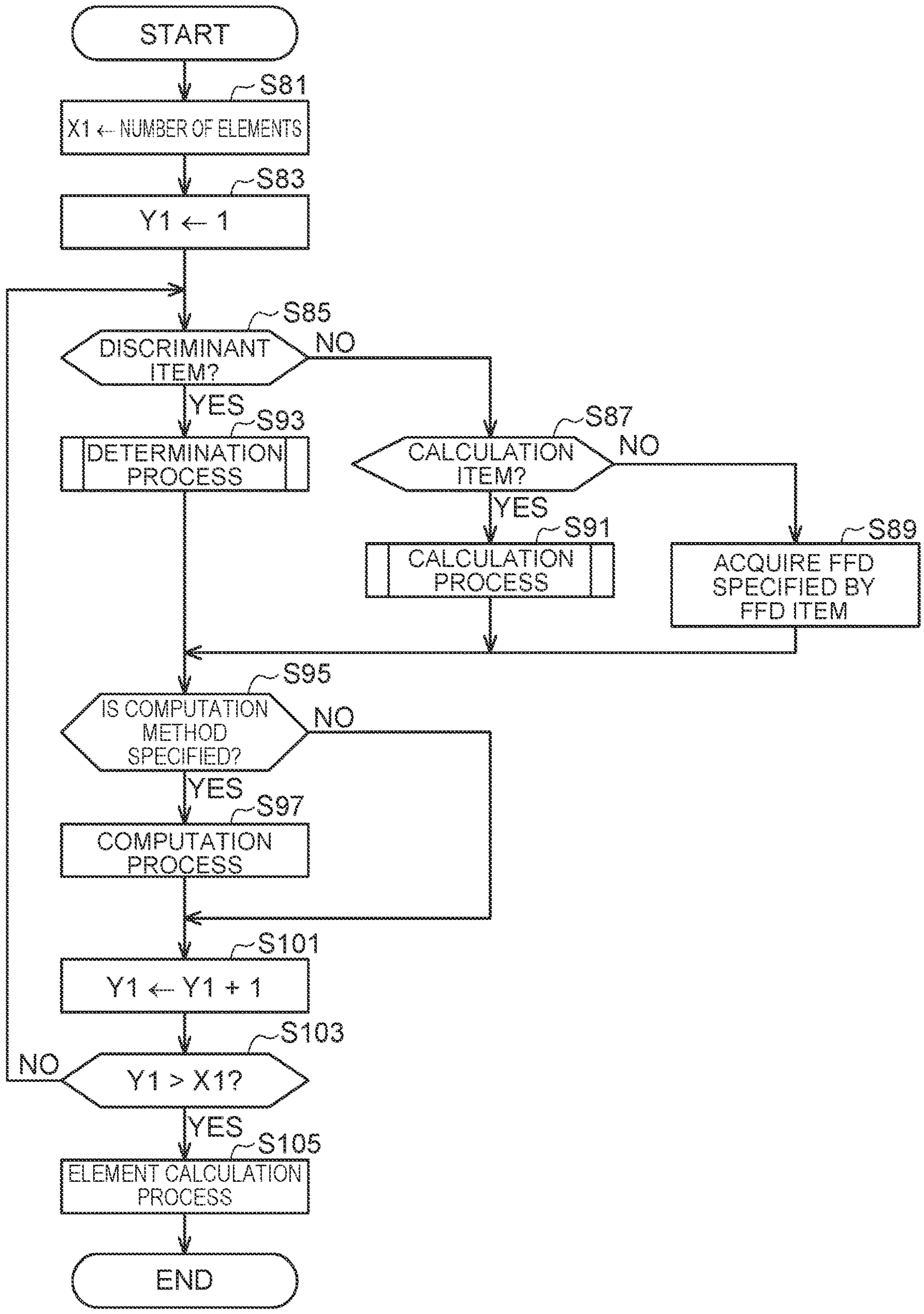
FIG. 11 is a flowchart illustrating a sub-routine for executing a calculation process for a calculation item.

The sub-routine for executing the calculation process will be described with reference to FIG. 11. The sub-routine shown in FIG. 11 is realized as the CPU 23 executes the diagnosis program stored in the storage device 24.

In this sub-routine, in the first step S81, the diagnosis engine 22 sets the number of elements in the calculation item as a loop number-of-times X1. The number of elements here refers to the number of elements in the calculation item for which the calculation process is to be executed. For example, in the case of the calculation item B21 shown in FIG. 4, two FFD items are set as the first sub-elements, and therefore the number of elements is two. For example, in the case of the calculation item B22 shown in FIG. 4, two FFD items are set as the second sub-elements, and therefore the number of elements is 2.

In the next step S83, the diagnosis engine 22 sets 1 as a factor Y1. Then, in step S85, the diagnosis engine 22 determines whether the element to be processed is a discriminant item. When the element to be processed is not a discriminant item (S85: NO), the diagnosis engine 22 moves to the process of step S87.

In step S87, the diagnosis engine 22 determines whether the element to be processed is a calculation item. When the element to be processed is not a calculation item (S87: NO), the diagnosis engine 22 moves to the process of step S89. In this case, the element to be processed is an FFD item.

In step S89, the diagnosis engine 22 acquires the FFD specified by the FFD item. Then, the diagnosis engine 22 moves to the process of step S95.

On the other hand, when the element to be processed is a calculation item (YES) in step S87, the diagnosis engine 22 moves to the process of step S91. In step S91, the diagnosis engine 22 executes the calculation process for the calculation item (i.e., the calculation process for the sub-element). Specifically, the diagnosis engine 22 executes the calculation process for the low-order element by executing the sub-routine of FIG. 11. When the calculation item here is a calculation item that is a first sub-element, in step S81, the number of the second sub-elements corresponding to that first sub-element is set as the loop number-of-times X1. After ending the calculation process, the diagnosis engine 22 moves to the process of step S95.

Here, according to the structure of the diagnosis program, when a low-order element is set, the calculation process for the low-order element is completed before the calculation process for a high-order element. Specifically, when the sub-element of the first calculation item is a calculation item (here referred to as a "second calculation item"), a sub-element is set for the second calculation item. The FFD specified by the FFD item set as the sub-element of the second calculation item is processed by executing the calculation process for the second calculation item, and a result of the calculation process for the second calculation item is output. Thereafter, the calculation process for the first calculation item is executed using the result of the calculation process for the second calculation item.

On the other hand, when the element to be processed is a discriminant item (YES) in step S85, the diagnosis engine 22 moves to the process of step S93. In step S93, the diagnosis engine 22 executes the determination process for the discriminant item. Specifically, the diagnosis engine 22 executes the determination process for the low-order element by executing the sub-routine of FIG. 10. After ending the determination process of step S93, the diagnosis engine 22 moves to the process of step S95.

Here, according to the structure of the diagnosis program, when a discriminant item is set as the sub-element, the determination process for a low-order element is completed before the calculation process for a high-order element. Specifically, when the item type of the discriminant item IT is the calculation item, a discriminant item (here referred to as a "sub-discriminant item") is sometimes set as the first sub-element for the calculation item. Further, an FFD item is sometimes set as the second sub-element of the sub-discriminant item. In this case, the FFD specified by the FFD item set as the second sub-element of the sub-discriminant item is processed by executing the determination process for the sub-discriminant item, and a result of the determination process for the sub-discriminant item is output. Thereafter, the calculation process for the calculation item is executed using the result of the determination process for the sub-discriminant item.

In step S95, the diagnosis engine 22 determines whether the time-direction computation method is specified by the calculation table. In the case of the patterns PT21 and PT22 shown in FIG. 6, the computation method is specified. When the computation method is specified (S95: YES), the diagnosis engine 22 moves to the process of step S97. In step S97, the diagnosis engine 22 executes the computation process of deriving processed data by processing the FFD in accordance with the specified computation method. Then, the diagnosis engine 22 moves to the process of step S101.

On the other hand, when the computation method is not specified (NO) in step S95, the diagnosis engine 22 moves to the process of step S101.

In step S101, the diagnosis engine 22 increments the factor Y1 by 1. In the next step S103, the diagnosis engine 22 determines whether the factor Y1 is larger than the loop number-of-times X1. When the factor Y1 is equal to or smaller than the loop number-of-times X1 (S103: NO), the diagnosis engine 22 moves to the process of step S85. Then, the diagnosis engine 22 changes the element to be processed and executes the processes of step S85 and the subsequent steps. On the other hand, when the factor Y1 is larger than the loop number-of-times X1 (S103: YES), the diagnosis engine 22 moves to the process of step S105.

In step S105, the diagnosis engine 22 executes an element calculation process. Specifically, in the element calculation process, the diagnosis engine 22 performs subtraction on pieces of time-series data for each of the times and thereby drives reprocessed data. For example, in the case of the pieces of time-series data shown in FIG. 12, the diagnosis engine 22 derives the time-series data shown in FIG. 13 as reprocessed data by the element calculation process. Then, the diagnosis engine 22 ends the sequence of processes.

Workings and Effects of Embodiment

First, a case where the acquisition unit 21 acquires "Pxxxx" shown in FIG. 3 as the DTC and then acquires the FFD corresponding to "Pxxxx" will be described.

When the acquisition unit 21 acquires "Pxxxx" and the FFD corresponding to "Pxxxx," the main processing routine of FIG. 9 is executed. Specifically, the discriminant set Dset11 corresponding to "Pxxxx" is retrieved from the database 30 (step S11). The discriminant item IT(1) is associated with the discriminant set Dset11. Therefore, the discriminant item IT(1) is retrieved from the database 30. Then, the determination process for the discriminant item IT(1) is executed (step S17). That is, the sub-routine of FIG. 10 is executed.

In the sub-routine of FIG. 10, the item type of the discriminant item IT(1) is the FFD item, and therefore the FFD specified by the FFD item of the discriminant item IT(1) is acquired by the diagnosis engine 22 (step S49).

For example, it is assumed that the discriminant table of the discriminant item IT(1) is the pattern PT11 shown in FIG. 5. In this case, since the time-direction coupling method is specified for the discriminant item IT(1) (step S55: YES), the coupling process is executed (step S57). In the pattern PT11, the coupling method is "maximum," the start time is 1, and the end time is 5. In the case where the FFD is 100, 200, 300, 400, and 410 shown in FIG. 2, 410 that is the maximum value of 100, 200, 300, 400, and 410 is derived as a processed value.

Then, in the comparison process, the comparative operator and the comparative value in the discriminant table of the discriminant item IT(1) are used (step S61). In the pattern PT11, the comparative operator is ">" and the comparative value is "Th11." Therefore, it is determined whether the processed value derived by the coupling process is larger than the comparative value Th11. When the processed value is larger than the comparative value Th11, 1 is output as an output value. On the other hand, when the processed value is equal to or smaller than the comparative value Th11, 0 is output as an output value.

Then, the logical coupling process is executed (step S67). In this case, since the loop number-of-times X is 1, the same value as the output value output by the comparison process is output as a coupled value. When the sub-routine ends and the determination process for the discriminant item IT(1) ends, the main processing routine of FIG. 9 is resumed. Specifically, it is determined in step S19 shown in FIG. 9 whether the result of the determination process is true. When the coupled value is 1, the result is true (step S19: YES), and therefore a notification is output to the effect that the vehicle part shown by the part information of the discriminant item IT(1) may have an abnormality (step S21). Then, investigation of the cause of the abnormality of the vehicle 10 represented by "Pxxxx" ends. On the other hand, when the coupled value is 0, the result is false (step S19: NO), and therefore a notification is output to the effect that a vehicle part that may have an abnormality was not found out (step S27). Then, investigation of the cause of the abnormality of the vehicle 10 represented by "Pxxxx" ends.

Next, a case where the acquisition unit 21 acquires "Pxxxy" shown in FIG. 3 as the DTC and then acquires the FFD corresponding to "Pxxxy" will be described.

When the acquisition unit 21 acquires "Pxxxy" and the FFD corresponding to "Pxxxy," the sequence of processes shown in FIG. 9 is executed. Specifically, the discriminant sets Dset21, Dset22, and Dset23 corresponding to "Pxxxy" are retrieved from the database 30 (step S11).

The case of the discriminant set Dset21 will be described. Two discriminant items IT(2) and IT(3) are associated with the discriminant set Dset21. Therefore, the discriminant items IT(2) and IT(3) are retrieved from the database 30. Then, the determination process is executed in accordance with the order of priority (step S17). For example, the determination process for the discriminant item IT(2) is executed first. When the result of the determination process for the discriminant item IT(2) is true (step S19: YES), a notification is output to the effect that the vehicle part shown by the part information of the discriminant item IT(2) may have an abnormality (step S21). In this case, the determination process for the discriminant item IT(3) is not executed.

On the other hand, when the result of the determination process for the discriminant item IT(2) is false (step S19: NO), the determination process for the discriminant item IT(3) is executed (step S17). In the sub-routine of FIG. 10, since the item type of the discriminant item IT(3) is the discriminant item A11, the determination process of step S53 among steps S49, S51, and S53 is executed. In this case, the determination process for the discriminant item IT(3) is suspended and the determination process for the discriminant item A11 is executed.

Since the item type of the discriminant item A11 is the FFD item, the FFD specified by the FFD item of the discriminant item A11 is acquired by the diagnosis engine 22 (step S49). Then, a processed value is derived by the coupling process of step S57 or the process of step S59. In this case, a processed value is derived using the discriminant table of the discriminant item A11.

In the next comparison process, the comparative operator and the comparative value in the discriminant table of the discriminant item A11 are used (step S61). Then, in the logical coupling process, a coupled value based on the output value derived by the comparison process is derived (step S67). When the determination process for the discriminant item A11 thus ends, the determination process for the discriminant item IT(2) is resumed. In the determination process for the discriminant item IT(2), since step S53 has ended, the processes of step S63 and the subsequence steps are executed.

Since the item type of the discriminant item IT(3) is the discriminant item, the discriminant table of the discriminant item IT(3) is, for example, the pattern PT12 shown in FIG. 5. In the discriminant table of the discriminant item IT(3), the coupling method is not specified (step S55: NO), and therefore the value specified by the start time is derived as a processed value. In this case, a coupled value derived by the determination process for the discriminant item A11 is derived as a processed value.

Then, in the next comparison process, the comparative value in the discriminant table of the discriminant item IT(3) and the derived value are compared using the comparative operator in the discriminant table of the discriminant item IT(3) (step S61). Thereafter, the logical coupling process is executed (step S67), and then the determination process for the discriminant item IT(3) ends. Then, the main processing routine of FIG. 9 is resumed. When the result of the determination process for the discriminant item IT(3) is true (step S19: YES), a notification is output to the effect that the vehicle part shown by the part information of the discriminant item IT(3) may have an abnormality (step S21). On the other hand, when the result of the determination process for the discriminant item IT(3) is false (step S19: NO), a notification is output to the effect that a vehicle part that may have an abnormality was not found out (step S27).

Next, the case of the discriminant set Dset22 will be described. Two discriminant items IT(4) and IT(5) are associated with the discriminant set Dset22. Therefore, the discriminant items IT(4) and IT(5) are retrieved from the database 30. Then, the determination process is executed in accordance with the order of priority (step S17). For example, the determination process for the discriminant item IT(4) is executed first. In the sub-routine of FIG. 10, since the item type of the discriminant item IT(4) is the calculation item B21, the calculation process of step S51 among steps S49, S51, and S53 is executed. That is, the determination process for the discriminant item IT(4) is suspended and the calculation process for the calculation item B21 is executed.

As shown in FIG. 4, two FFD items are set as the first sub-elements for the calculation item B21. First, the process is executed for the first FFD that is the FFD specified by the first FFD item of the two FFD items. Specifically, in the sub-routine of FIG. 11, the first FFD specified by the first FFD item is acquired by step S93 among steps S89, S91, and S93. Then, first processed data is derived by processing the first FFD in accordance with the calculation table of the calculation item B21 (steps S95, S97).

Then, the process is executed for the second FFD that is the FFD specified by the second FFD item of the two FFD items. Specifically, the second FFD specified by the second FFD item is acquired by the process of step S93 among steps S89, S91, and S93. Then, second processed data is derived by processing the second FFD in accordance with the calculation table of the calculation item B21 (step S95, S97).

Then, the element calculation process is executed (step S105). In the element calculation process, reprocessed data is derived based on the first processed data and the second processed data. When the calculation process for the calculation item B21 thus ends (step S51 of FIG. 10), the determination process for the discriminant item IT(4) is resumed. In the determination process for the discriminant item IT(4), a processed value is derived by processing the reprocessed data in accordance with the discriminant table of the discriminant item IT(4) (steps S55, S57, S59). The subsequent process is the same as in the above case and therefore will not be described.

When the result of the determination result for the discriminant item IT(4) is false (step S19: NO), the determination process for the discriminant item IT(5) is executed (step S17). As shown in FIG. 4, the discriminant item IT(5) has the discriminant item A12 and the FFD item as the item type. The determination process for the discriminant item A12 (step S17) will be described.

In the sub-routine of FIG. 10, since the item type of the discriminant item A12 is the calculation item B22, the calculation process of step S51 among steps S49, S51, and S53 is executed. That is, the determination process for the discriminant item A12 is suspended and the calculation process for the calculation item B22 is executed. When the calculation process for the calculation item B22 ends, the determination process for the discriminant item A12 is resumed. In the determination process for the discriminant item A12, a processed value is derived based on the reprocessed data derived by the calculation process (steps S55, S57, S59).

Then, in the next comparison process, the comparative value in the discriminant table of the discriminant item A12 and the derived value are compared using the comparative operator in the discriminant table of the discriminant item A12 (step S61). Thereafter, when the logical coupling process is executed (step S67), the determination process for the discriminant item A12 ends. When the result of the determination process for the discriminant item A12 is true (step S19: YES), a notification is output to the effect that the vehicle part shown by the part information of the discriminant item IT(5) may have an abnormality (step S21). On the other hand, when the result of the determination process for the discriminant item IT(5) is false (step S19: NO), the determination process is executed for the FFD item of the discriminant item IT(5) (step S17). The subsequent process is the same as in the above case and therefore will not be described.

This embodiment can produce the following effects.

(1) In this embodiment, the diagnostic accuracy and the diagnosable contents can be changed by changing the contents of the discriminant items IT associated with the discriminant sets, changing the number of the discriminant items IT, or changing or adding to the discriminant tables of the discriminant items IT. Therefore, the diagnosis program stored in the storage device 24 itself need not be updated.

Thus, when the same contents are stored in the database 30 of the abnormality diagnosis device 20A and the database 30 of the abnormality diagnosis device 20B, the same diagnosis result can be obtained by the abnormality diagnosis device 20A and the abnormality diagnosis device 20B.

(2) Specifically, when the discriminant table is changed so as to change at least one of the time-direction coupling method, the start time, and the end time, the processed value derived by processing the FFD in accordance with the discriminant table changes. When the processed value changes, the diagnostic accuracy changes. Further, changing the discriminant table so as to change the comparative operator can change the diagnostic accuracy. Changing the discriminant table so as to change the comparative value can change the diagnostic accuracy. Thus, the diagnostic accuracy can be adjusted by changing the contents of the discriminant table, without changing the diagnosis program.

(3) Changing the contents of the calculation table of the calculation item can change the processed data and the processed value. For example, changing the calculation table so as to change the time-direction computation method can change the processed data and the processed value. Further, changing the calculation table so as to change the time position can change the processed data and the processed value. When the processed data and the processed value change, the diagnostic accuracy also changes. Thus, the diagnostic accuracy can be adjusted by changing the calculation table of the calculation item, without changing the diagnosis program.

(4) In this embodiment, when the discriminant set with which a plurality of discriminant items IT is associated is retrieved from the database 30, diagnosis is executed from a discriminant item IT that ranks high in the order of priority. In this case, when it is diagnosed for one of the discriminant items IT that the vehicle part has an abnormality, diagnosis for the remaining discriminant items IT is not executed. Thus, compared with when diagnosis is performed for all the discriminant items IT associated with the discriminant set, the time taken to investigate the cause of the abnormality in the vehicle 10 can be shortened.

Modified Examples

The above embodiment can be implemented with the following changes made thereto. The embodiment and the following modified examples can be implemented in combination within such a range that no technical inconsistency arises.

- When a discriminant set with which a plurality of discriminant items IT is associated is retrieved from the database 30, the sequence of processes for the discriminant set may be ended by performing diagnosis for all the discriminant items IT.
- The number of the vehicle state values composing the FFD need not be five and may be any number not less than two.
- The comparative operator in the discriminant table may be other than the operators described in the embodiment. Examples of other comparative operators include "," "," and "#."
- The time-direction coupling method in the discriminant table may be other than "maximum," "minimum," and "extraction" described in the embodiment. Examples of other coupling methods include "average." When the coupling method is "average," an average value of the selected vehicle state values can be output as a processed value.
- The diagnosis engine 22 is not limited to one that includes the CPU 23 and the storage device 24 and executes a software process. That is, the diagnosis engine 22 may have any of the following configurations (a) to (c):

(a) The diagnosis engine 22 includes one or more processors that execute various processes in accordance with a computer program. The processors include a CPU, and a memory, such as an RAM or an ROM. The memory stores program codes or commands configured to cause the CPU to execute processes. The term "memory," i.e., computer-readable medium, covers all available media that can be accessed by a general-purpose or special-purpose computer.

(b) The diagnosis engine 22 includes one or more dedicated hardware circuits that execute various processes. Examples of dedicated hardware circuits include an application-specific integrated circuit, i.e., an ASIC or an FPGA. ASIC stands for Application Specific Integrated Circuit, and FPGA stands for Field Programmable Gate Array.

(c) The diagnosis engine 22 includes a processor that executes some of various processes in accordance with computer programs, and a dedicated hardware circuit that executes the remaining processes of the various processes.

What is claimed is:

1. An abnormality diagnosis device that is capable of communicating with a vehicle and investigates a cause of an abnormality in the vehicle, the vehicle having a function of, when an abnormality occurs, storing in a vehicle storage unit an abnormality identification code that is a code showing details of the abnormality and vehicle information that is time-series data of vehicle state values that are values showing a vehicle state and includes the vehicle state value at a time of occurrence of the abnormality, the abnormality diagnosis device comprising:

an acquisition unit that acquires the abnormality identification code and the vehicle information stored in the vehicle storage unit;

a diagnosis engine having an execution device and a storage device that stores a diagnosis program to be executed by the execution device; and a database which stores a plurality of discriminant sets corresponding to the respective abnormality identification codes and in which contents stored are rewritable, wherein:

a discriminant item is associated with each of the discriminant sets, the discrimination item being an item relating to a vehicle part that is a possible cause of an abnormality represented by a corresponding one of the abnormality identification codes;

each of the discriminant items has part information that is information showing the vehicle part, and a discriminant table including a rule for analyzing the vehicle information relating to the vehicle part;

the diagnosis engine retrieves, from the database, the discriminant set that corresponds to the abnormality identification code acquired by the acquisition unit; and the diagnosis engine diagnoses whether the vehicle part shown by the part information of the discriminant item associated with the retrieved discriminant set has an abnormality by analyzing the vehicle information acquired by the acquisition unit in accordance with the rule in the discriminant table of the discriminant item.

2. The abnormality diagnosis device according to claim 1, wherein:

the discriminant table has, as the rule, information on a processing method of the vehicle information for deriving, from the vehicle information, a processed value that is a value used to determine whether the vehicle part has an abnormality;

the discriminant table further has information on a comparative value that is a value to be compared with the processed value, and information on a comparative operator for comparing the processed value and the comparative value;

the diagnosis engine derives the processed value by analyzing the vehicle information in accordance with the processing method in the discriminant table; and the diagnosis engine compares the comparative value in the discriminant table and the processed value using the comparative operator in the discriminant table, and diagnoses whether the vehicle part has an abnormality based on a result of the comparison.

3. The abnormality diagnosis device according to claim 2, wherein:

the discriminant table further has information on an item type;

the discriminant items include those of which the item type in the discriminant table is an item of the vehicle information and those of which the item type in the discriminant table is a calculation item;

the calculation item has a calculation table, and the calculation table includes information on a processing method by which the vehicle information is processed to derive processed data that is time-series data including a plurality of values;

when the item type in the discriminant table of the discriminant item is the item of the vehicle information, the diagnosis engine derives the processed value by analyzing the vehicle information in accordance with the processing method in the discriminant table, compares the comparative value in the discriminant table and the processed value using the comparative operator in the discriminant table, and diagnoses whether the vehicle part has an abnormality based on a result of the comparison;

when the item type in the discriminant table of the discriminant item is the calculation item, the diagnosis engine derives the processed data in the same format as the vehicle information by processing the vehicle information in accordance with the processing method in the calculation table of the calculation item, derives the processed value by analyzing the processed data in accordance with the processing method in the discriminant table, compares the comparative value in the discriminant table and the processed value using the comparative operator in the discriminant table, and diagnoses whether the vehicle part has an abnormality based on a result of the comparison.

4. The abnormality diagnosis device according to claim 3, wherein:

for the calculation item, one or more items of the vehicle information are set as sub-elements;

when those of the calculation items that have a plurality of sub-elements are designated as prescribed calculation items, in a case where the item type in the discriminant table of the discriminant item is the calculation item and the calculation item is not the prescribed calculation item, the diagnosis engine derives the processed data by processing the vehicle information specified by the item of the vehicle information set as the sub-element in accordance with the processing method in the calculation table, derives the processed value by analyzing the processed data in accordance with the processing method in the discriminant table, compares the comparative value in the discriminant table and the processed value using the comparative operator in the discriminant table, and diagnoses whether the vehicle part has an abnormality based on a result of the comparison;

in a case where the item type in the discriminant table of the discriminant item is the calculation item and the calculation item is the prescribed calculation item, the diagnosis engine derives a plurality of pieces of processed data by processing a plurality of pieces of vehicle information specified by the respective items of the vehicle information set as the sub-elements in accordance with the processing method in the calculation table, derives reprocessed data in the same format as the vehicle information by performing subtraction on values of the pieces of processed data for each of times, derives the processed value by analyzing the reprocessed data in accordance with the processing method in the discriminant table, compares the comparative value in the discriminant table and the processed value using the comparative operator in the discriminant table, and diagnoses whether the vehicle part has an abnormality based on a result of the comparison.

5. The abnormality diagnosis device according to claim 1, wherein:

when those of the discriminant sets with which a plurality of discriminant items is associated are designated as predetermined discriminant sets, in the predetermined discriminant set, an order of priority that defines an order of diagnosis is set for the discriminant items;

when the diagnosis engine retrieves the predetermined discriminant set from the database, the diagnosis engine executes diagnosis in order from the vehicle part shown by the part information of the discriminant item that ranks high in the order of priority among the discriminant items of the predetermined discriminant set; and when the diagnosis engine diagnoses that the vehicle part has an abnormality as a result of diagnosis for one of the discriminant items, the diagnosis engine does not execute diagnosis for remaining discriminant items.

* * * * *